United States Patent
AbuAkeel

(10) Patent No.: US 6,566,777 B2
(45) Date of Patent: May 20, 2003

(54) ELASTIC WAVE ACTUATOR

(76) Inventor: Hadi AbuAkeel, 3010 Quail Ridge Cir., Rochester Hills, MI (US) 48309

( * ) Notice: Subject to any disclaimer, the term of this patent is extended or adjusted under 35 U.S.C. 154(b) by 0 days.

(21) Appl. No.: 09/972,513

(22) Filed: Oct. 5, 2001

(65) Prior Publication Data

US 2003/0067240 A1 Apr. 10, 2003

(51) Int. Cl.[7] .................... H02K 21/00; H02K 23/44
(52) U.S. Cl. .................... 310/209; 310/191; 310/261
(58) Field of Search ................ 310/82, 83, 85, 310/86, 261, 91, 75 R, 75 D, 195, 209

(56) References Cited

U.S. PATENT DOCUMENTS

| | | | |
|---|---|---|---|
| 3,495,108 A | * | 2/1970 | Van Buskirk ............... 310/68 |
| 3,561,006 A | | 2/1971 | Humphreys |
| 4,044,274 A | | 8/1977 | Ohm |
| 4,379,976 A | | 4/1983 | Pitchford et al. |
| 4,684,836 A | | 8/1987 | Hart |
| 5,497,041 A | | 3/1996 | Kondoh et al. |
| 6,100,619 A | * | 8/2000 | Buscher et al. ............... 310/83 |

* cited by examiner

*Primary Examiner*—Tran Nguyen
(74) *Attorney, Agent, or Firm*—Gary Baker

(57) ABSTRACT

An elastic wave actuator and method to convert electrical energy to mechanical energy with alternate high speed or high torque output options. The actuator comprises a cylindrical rotor flexible shell rotatably mounted coaxially within a stator. A radially disposed series of electromagnetic poles in the stator is energized to generate a rotating electromagnetic field that attracts and deforms the flexible shell to engage the frictional surface of the stator at points of contact that progress around the stator. The circumference of the flexible shell being different from the circumference of the inner stator surface, the rotor rotates at a rate proportionate to the difference between the shell and stator circumferences and much slower than the electromagnetic field. An output shaft coupled to the rotor flexible shell will provide high torque low speed power output. Alternately, an elliptical cam and cam output shaft mounted coaxially within the rotor flexible shell provides a high speed low torque power output.

22 Claims, 4 Drawing Sheets

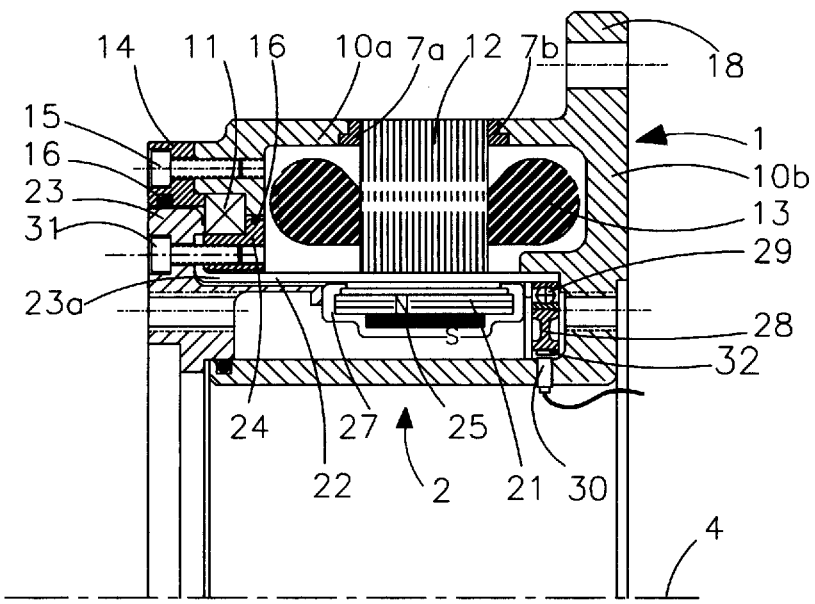
FIG(1)
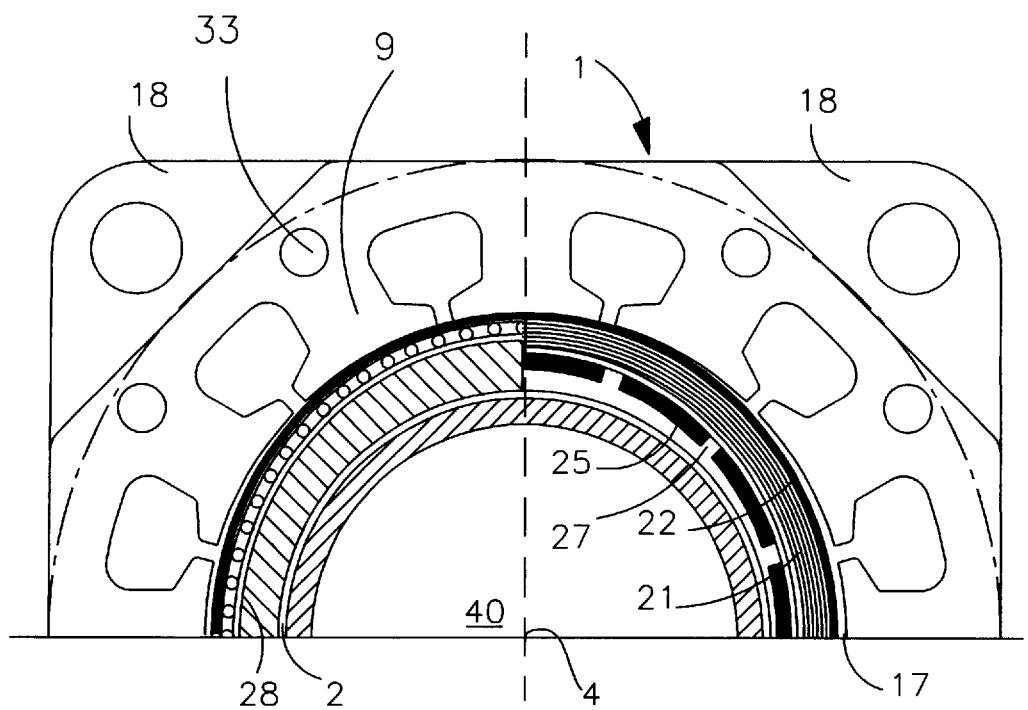
FIG(2)

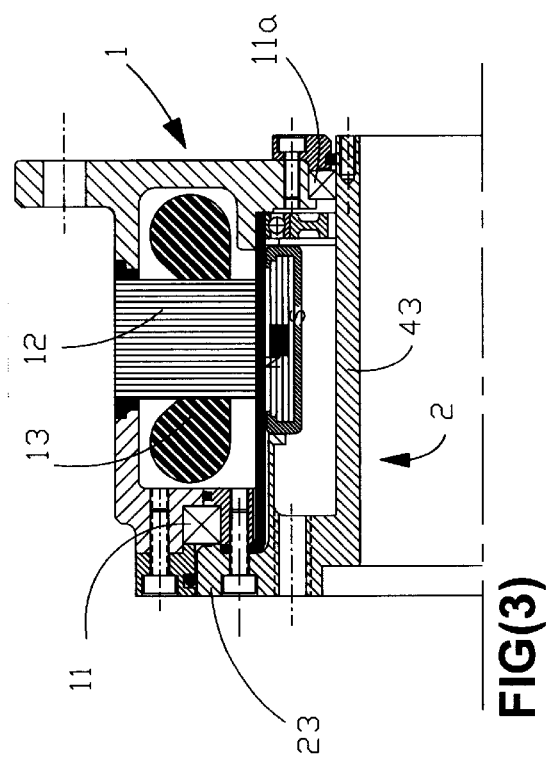
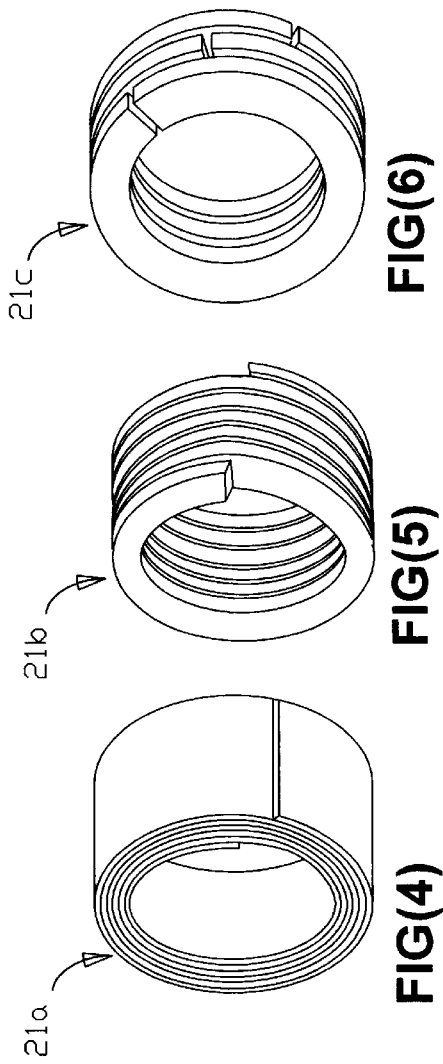

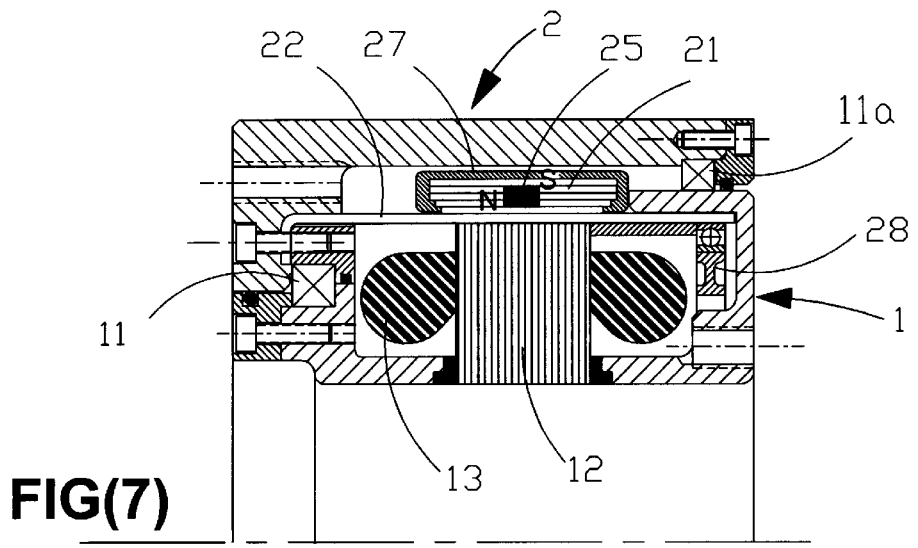
FIG(7)
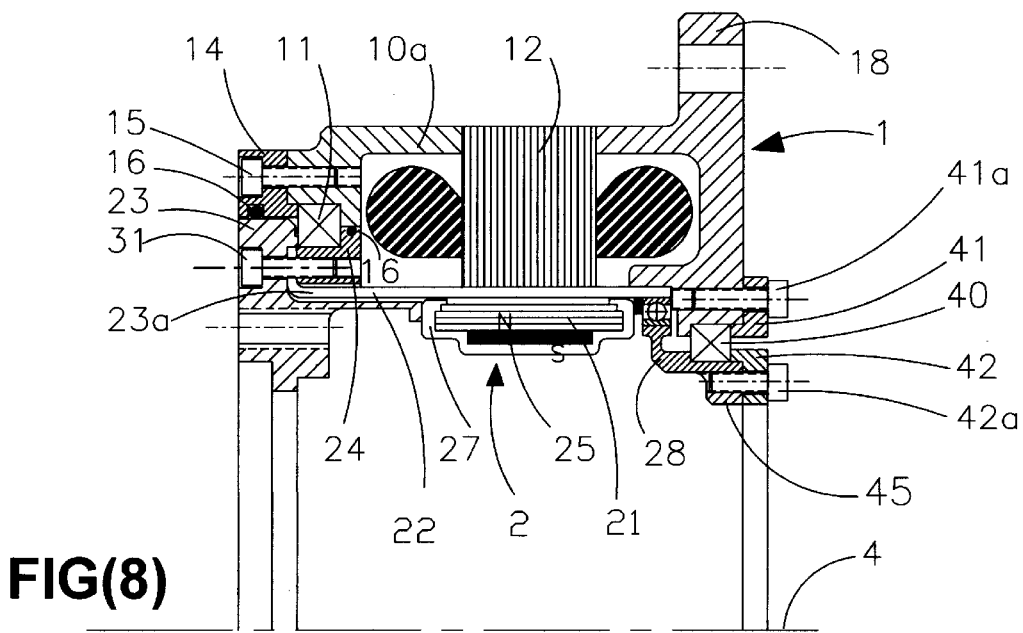
FIG(8)

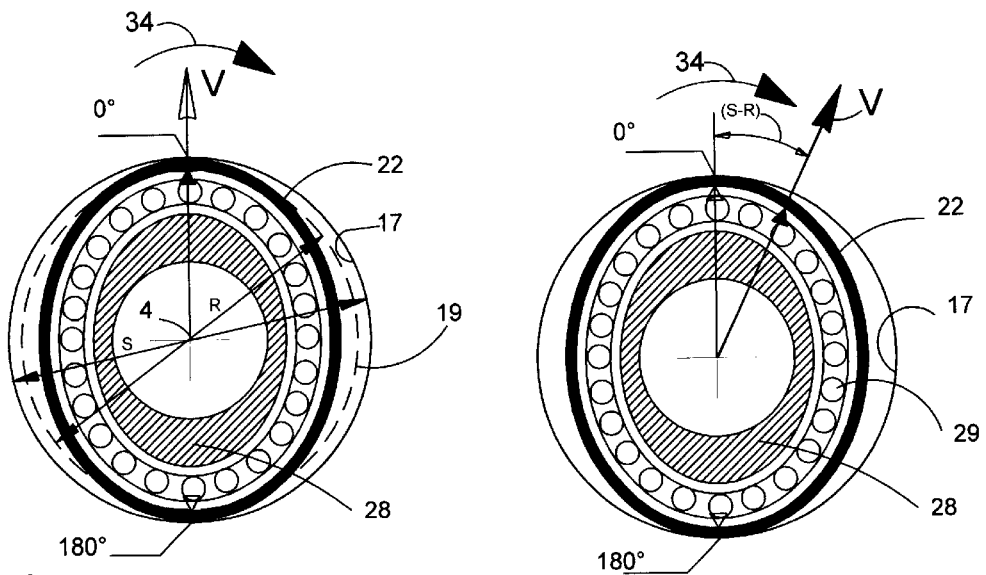
FIG(9)   FIG(10)
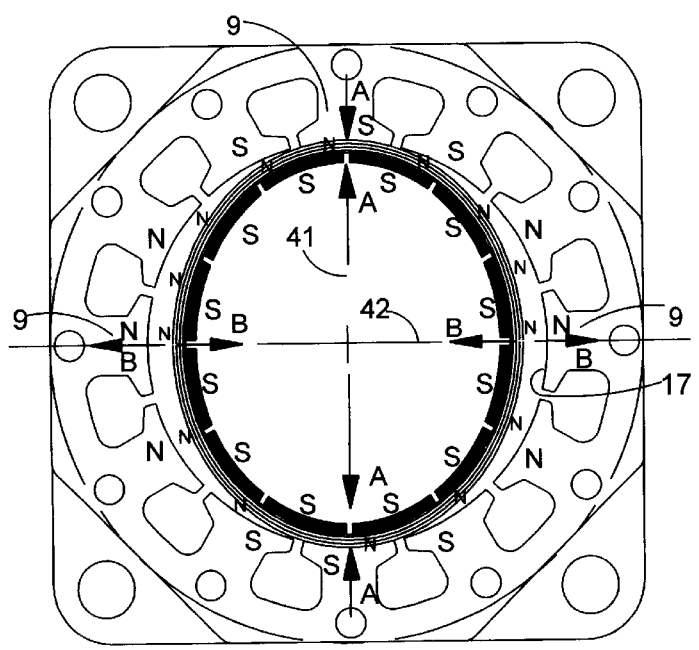
FIG(11)

ELASTIC WAVE ACTUATOR

BACKGROUND OF THE INVENTION

1. Field of the Invention

This invention relates to a class of actuators capable of configuration to provide high-speed low-torque or to provide low speed high-torque output. The invention includes a method to convert electrical energy directly into mechanical energy utilizing an elastically deformable flexible rotor.

2. Description of Related Art

Conventional actuators of a given power rating, such as electrically or hydraulically powered motors, normally rotate at high speed with low torque. The speed is determined by the electrical excitation frequency and the number of motor poles for an electric motor; or by the flow rate for a hydraulic or pneumatic motor. To obtain low speed and high torque output at rated power, actuators are often coupled with any of several mechanical speed reducers, well known in the mechanical arts, such as chain driven gear sets, belt driven pulley sets and direct gear reduction. Gear reducers may include several stages of speed reduction as in stepped gear reduction or planetary gearing systems. In many industrial applications, high ratio reducers are commonly used with conventional motors running at a relatively high speed, typically 1000 to 5000 rpm or more, to obtain low-speed output rotation with high torque. Otherwise, high power high-torque motors would be used at great penalty of cost, size, and weight.

Some electrically powered motors are commercially available that generate high-torque and operate at low speed by employing a large number of electromagnetic stator poles. However, such motors are usually bulky and expensive. Similarly, low-speed and high-torque hydraulic motors are bulky and heavy with the additional requirement of a separate hydraulic power supply. Applications that are cost sensitive often utilize a high-speed motor coupled to a commercially available gear reduction system such as a multi-ratio gear reducer, a worm gear reducer or a planocentric motion reducer. For many applications it's desirable that the actuator and the speed reducer are provided with a central hole to pass process cables and lines through motorized joints.

The Harmonic Drive U.S. Pat. No. 3,196,713, is a well known commercial speed reducer which includes a flexible internal shell having externally cut gear teeth that engage a rigid outer shell having internally cut gear teeth. The flexible shell is deformed elliptically by a rotating elliptical cam to engage the outer shell at two diametrically opposed locations. The rotating cam imparts a rotating elastic wave into the flexible shell and causes the shell to rotate about its central axis. The flexible shell is usually coupled to an output shaft that rotates rigidly with it. The difference in the number of teeth between the flexible shell and the outer rigid shell defines the ratio of rotation between the speed of the motor that rotates the cam and the speed of the output shaft. Conventionally, the motor is external to the speed reducer and is coupled mechanically to the elliptical cam. Since the cam is rotated at the high speed of the motor, its inertia negatively impacts the servo controllability of an output load. Alternately, in Ohm, U.S. Pat. No. 4,044,274, the flexible shell is placed within tile air-gap between the motor's rotor and stator to provide a closely integrated actuator. However, such arrangement increases the width of the air-gap and reduces the power conversion efficiency of the motor.

Another type of motor achieves gear reduction to high torque using a rigid gear shell that progresses within a rigid fixed outer gear having a larger number of gear teeth. A rotating magnetic field, generated by stator poles mounted along the circumference of the outer gear, can induce a rigid style gear shell to roll along the outer gear in an orbital fashion. The low gear shell inertia and the absence of a bulky mechanical element rotating at high speed are features conducive of a desirable low-speed motion control. For example, in Pitchford et al, in U.S. Pat. No. 4,379,976, a rigid orbiting shell progressively engages stator gear teeth and rotor gear teeth along one common line of contact in a planocentric motion. This type of single point loading reduces possible torque output of the motor, promotes vibration, and generates excessive loads on the rotor bearings compared to the present invention. In addition, the motor poles are energized in steps and are not controllable for smooth motion.

Humphreys, U.S. Pat. No. 3,561,006, discloses an electromagnetic actuator having an electromagnetic stator that elliptically deforms a coaxial spline having internal as well as external gear teeth. The coaxial spline progressively engages matching external teeth on an output spline and stator internal teeth, the progressive rotation of the output spline being transmitted to a power output shaft at a rate reduced from the electromagnetic rotation rate. Humphreys employs magnetic shim stock to reduce magnetic reluctance and suggests roughened surfaces instead of gearing for surface engagement. This prior art suffers from the multiplicity of gear engagement surfaces, which is subject to wear, frictional losses and slip with frictional engagement. The, stator, coaxial spline, and output spline elements all serve both torque transmission and magnetic circuit functions. These functions require conflicting material properties of hardness and magnetic reluctance with one usually attained at the detriment of the other. Hence, power conversion efficiency and durability are compromised. The stepping motion of the device is also a serious limitation.

Kondoh et al, in U.S. Pat. No. 5,497,041 (1996) discloses a low-speed motor wherein a rotating magnetic field is formed in a geared outer stator to induce progressive deformation in a geared inner flexible shell containing a series of permanent magnets with alternating polarity. The progressive rotation of the inner flexible shell is transmitted to a power output shaft. In this prior art, the flexible shell is naturally circular and assumed to deform elliptically when the magnetic field is applied. However there is no mechanism to assure such desired elliptical form; the flexible ring could assume the least energy position of single-point contact with the stator and remain circular rather than the desired two-point contact of elliptical deformation which has a higher elastic energy level. The rotor naturally assumes the least energy circular configuration and may jam into a non-rotating vibratory state. In addition, the position of the Kondoh internal gear may become indefinite relative to the position of the rotating magnetic field resulting in compromised precision with this actuator configuration.

The prior art addresses electromagnetic actuators that combine electric motor principles with high gear ratio flexible speed reducers. However, these actuators are impractical for many applications due to the incompatible design considerations involved in combining the functions of electromagnetic permeability and gear engagement in the stator and rotor parts of the motor. Prior art also requires gearing between the rotor and stator elements to avoid slippage in high torque applications. Optimal rotor geometry is not inherent in much of the prior art. These shortcomings are addressed in the present invention.

The unique construction of the present invention overcomes these serious shortcomings and provides other advantages in several ways. In one embodiment, the actuator utilizes the large magnetic attractive forces and friction between the stator and a ferromagnetic rotor flexible shell for the transmission of high torque at low speed, thus avoiding the mechanical complexity and financial cost associated with gearing. Another embodiment includes a series of uniformly polarized permanent magnet segments radially mounted circumferentially to the rotor flexible shell to generate an elliptical rotor shape during electromagnetic interaction with the stator and propagates an elastic wave into the flexible shell. Optimal rotor shape can also be provided by locating an elliptical cam within the rotor flexible shell. The elliptical cam is carried by the sequential flexible shell deformation to rotate synchronously with the electromagnetic field and provides access to high speed mechanical energy. A synchronizing gear element may be provided on the rotor flexible shell to maintain electronic synchronization of rotor position with the electromagnetic field for field commutation and closed loop operation. Energy-conversion efficiency is improved by isolating the gear engagement elements from the magnetic circuit elements, thus allowing the optimum use of materials for each function independent of the other. High precision of motion in servo-controlled low speed drives is obtained by avoiding the need for a high-inertia high-speed rotor or external gear reducer. Low manufacturing cost is realized as fewer mechanical elements are required and high cost load-bearing gearing is eliminated. The Actuator can be built within the confines of a conventional electric motor shell of equal power without the added volume or cost of a speed reducer for low speed output.

The present invention thus provides a low cost, compact actuator that can be designed for optimum performance and manufactured with conventional manufacturing technologies. In all embodiments, the invention allows the rotor to have a relatively large internal axial hole suitable for passing wires and hoses often needed for motorized manufacturing process equipment. Furthermore, for applications such as motorized and remote controlled toys, where low cost is critical regardless of rotor synchronization, this invention provides an ideal actuator with a minimum number of parts for safety and reliability and mass production at a lower cost. The invention provides for an actuator that can be configured to supply low-speed high-torque power output or high-speed low-torque power output or both types of power output from the same actuator.

OBJECT OF THE INVENTION

It is the object of this invention to provide an elastic-wave actuator having a low rotor inertia and an elastically deformable shell that allows: 1) direct electrical energy conversion to mechanical energy with a high torque at low speed; 2) low manufacturing cost; 3) high transfer efficiency between electrical and mechanical energy; 4) minimal lost motion or slipping; 5) compact packaging with minimized rotor inertia; 6) a variety of configurations adaptable to varying application requirements; 7) convenient passage of process lines through a central hole in the actuator; and, 8) an alternate output shaft to provide high speed power output from an elliptical cam.

SUMMARY OF THE INVENTION

This invention is an electric energy conversion actuator comprising a stator, a rotor having a flexible shell rotatably supported inside the stator with bearings, and a rigid rotor output flange coupled coaxially to the flexible shell. The stator includes an array of electromagnets arranged along its circumference that are energized to generate a rotating electromagnetic field. Most preferably, the magnetic field attracts and deforms the flexible shell into a substantially elliptical shape to frictionally contact a frictional surface of the stator at two diametrically opposed circumferencial locations. An elastic wave is thus induced into the rotor flexible shell, which progressively rolls along the frictional surface of the stator. Alternately, the flexible shell may be deformed into an elliptical shape by means of a rotatable elliptical cam. Though the elliptical cam is preferred, other cam forms may be used to provide frictional contact at more than two diametrically opposed circumferencial locations. The electromagnets are powered preferably by a multiple phase power supply and synchronized by electronic control means commonly practiced in the art such as direct commutation and sensor directed electronic controls. Pulse width modulated electrical excitation may also be used for precision motion applications. The circumference of the rotor flexible shell differs from the circumference of the frictional surface of the stator by a predetermined amount that causes the flexible shell to rotate at much lower speed than the rotating electromagnetic field. By eliminating the high-speed, high-inertia armature found in most motors, the low-speed rotor output shaft coupled to the flexible shell of this invention supplies high torque with inherently low inertia and high servo-control accuracy. The elliptical cam rotates at the high speed of the rotating magnetic field and provides access to high-speed motion. The flexible shell can be coated with friction promoting material and made of a high electromagnetic permeability metal such as silicon steel to provide high-energy conversion efficiency. Compactness and energy efficiency are also promoted in one embodiment by means of an elastic core of silicon steel sheets preferably laminated and coiled inside or around the flexible shell to maintain adequate magnetic flux path and minimize eddy-current generation. In another embodiment, uniformly polarized permanent magnet segments are mounted circumferentially to the flexible shell to enhance the magnetic flux properties and to maintain the elliptical shape and a holding torque capability when the actuator is not electrically energized. In addition, attractive and repulsive interaction between the permanent magnet segments and the stator electromagnetic poles can induce optimum elliptical shape in the flexible shell.

The rotor flexible shell may be fixedly attached to the rotor output flange, the operative stresses being accommodated by the resilience of the flexible shell. Alternatively, the rotor may have radial splines that interlace with matching radial splines of the rotor output flange to transmit power and accommodate the radial deformations operatively induced in the flexible shell. In one embodiment, the rigid output flange and rotor are mounted using a single moment carrying bearing set at one end of the stator. In another embodiment the rigid output flange extends with a cylindrical shaft to mount on bearing sets at each end of the stator.

In another embodiment, the flexible shell has serrations, or gear teeth, which mesh with matching serrations of equal pitch formed in or near the stator frictional surface. The serration prevent slippage and keep the rotor synchronized with the rotating electromagnetic wave while frictional contact of the flexible shell and stator frictional surface remains the primary means of power transmission. The serrations may have the geometry of conventional gear teeth such as involute, circular, or cycloidal geometry forms and thus provide a definite ratio of speed between the electromagnetic field and the rotor speed. In a preferred embodiment, rotor synchronization can be maintained by a sensor-encoder that provides a feedback-indicating signal of rotor position to an electronic controller system.

BRIEF DESCRIPTION OF THE DRAWINGS

The invention will now be more particularly described in connection with its preferred embodiments and with reference to the accompanying drawings wherein:

FIG. 1 is a half-sectional view along the axis of the stator and flexible rotor of an internal rotor embodiment of an elastic wave actuator.

FIG. 2 is a half-sectional view orthogonal to the view of FIG. 1.

FIG. 3 is a half-sectional view, as in FIG. 1, but according to an embodiment having permanent magnet segments mounted to the flexible rotor core and having the rotor output shaft mounted on bearings at two ends.

FIG. 4 is a view of a laminated core having compact spiral ribbon.

FIG. 5 is a view of a laminated core having compact helical ribbon.

FIG. 6 is a view of a laminated core having segmented rings.

FIG. 7 is a half-sectional view along the axis of an elastic wave actuator configured to have an outer rotor and internal stator.

FIG. 8 is a sectional view similar to FIG. 1 but showing an embodiment having a high-speed cam output shaft.

FIG. 9 is a diagram showing the flexible rotor deformed into an exaggerated elliptical form for clarity.

FIG. 10 is similar to FIG. 9 but shows the flexible rotor position after a full rotation of the magnetic field.

FIG. 11 is a diagram showing attraction and repulsion between the permanent magnets and the electromagnetic poles to induce elliptical deformation in a flexible shell.

DESCRIPTION OF THE INVENTION

Description of Components

According to one aspect of the present invention, shown in FIG. 1 and FIG. 2, there are provided a stator 1 and a rotor 2. The rotor 2 being rotatably supported inside the stator 1 with bearing 11. The stator 1 and rotor 2 share a common central axis 4.

The stator 1 consists of housing parts 10a and 10b fixedly supporting the bearing 11, stator pole laminations 12 and electrical stator coils 13 to electrically energize a plurality of electromagnetic poles, thereafter referred to as electromagnets 9, as is conventional with electric motors. The stator having a hollow central cavity to functionally receive the rotor 2 and having a stator frictional surface 17. The stator housing parts 10a and 10b may include actuator mounting brackets 18 for mounting the elastic wave actuator in a working position. The bearing 11 outer race is fixedly attached to the stator housing part 10a by means of first clamping ring 14 and a plurality of bolts 15.

The rotor 2 consists of a core 21 mounted to a flexible shell 22. FIG. 2 shows the flexible shell 22 coupled at one end to a rotor output flange 23 by means of a plurality of bolts 31 which, in turn, clamp the inner race of bearing 11 between the rotor output flange 23 and a second clamping ring 24. Alternately, in FIG. 3, the rotor output flange 23 may have an extended shaft 43 to support the rotor 2 within the stator 1 at two axially extended locations by means of bearings 11 and 11a. The flexible shell 22 may be capable of electromagnetic deformation to an elliptical shape by means of magnetic interaction with diametrically opposed stator electromagnets 9. The elliptical shape may also be retained by means of an elliptical cam 28 slideably positioned coaxially within the inner surface of the flexible shell 22. The presence of an elliptical cam bearing 29 between the elliptical cam 28 and flexible shell 22 reduces friction between the cam 28 and the flexible shell 22. The bearing 29 may be any conventional slim-form bearing known in the art that conforms easily to the shape of the cam 28 such as a ball bearing, a roller bearing, a low friction interface such as Teflon® or a lubricated bronze bushing.

The rotor 2 and stator 1, in FIG. 1, are supported relative to each other by bearing 11 which allows rotation of the rotor 2, but not lateral or angular movement of the rotor 2, about the central axis 4. Bearing 11 may be a moment carrying bearing, such as a cross roller bearing or a pair of opposed angular contact bearings. Alternately, the rotor 2 may be rotationally mounted to the stator 1 using two radial bearings axially spaced from each other along an output shaft 43 such as on opposite ends of the stator pole laminations 12 as shown in FIG. 3. Oil seals 16 at both sides of bearing 11 may be used to retain lubricants within bearing 11.

For best operating efficiency, the stator pole laminations 12 and the flexible rotor core 21 are best made with low-loss magnetically permeable material such as silicon steel and preferably laminated as conventionally practiced to provide a low energy loss path for the electromagnetic flux produced by the stator electromagnets 9. In preferred embodiments, the core 21 may be silicon steel laminations in the form of a compact spiral ribbon 21a (FIG. 4) which may also be split axially to form a layered set of concentric thin shells. The core 21 may also be formed as a compact helical ribbon 21b (FIG. 5), or split radially to form a layered stack of split flat rings 21c (FIG. 6). The stator laminations 12 may be clamped solidly between stator clamp parts 7a and 7b by means of a plurality of axial bolts or rivets (not shown) extending through a plurality of holes 33. The rotor core 21 mounted to the flexible shell 22 may be retained with a flexible mold 27, preferably of a polymer formulation tolerant of high temperature. Uniformly polarized permanent magnet segments 25 may be embedded or circumferentially mounted to the rotor core 21 to improve the attractive force between the rotor 2 and the stator 1. Permanent magnets 25 also maintain the elliptical form of the flexible shell 22 when the stator coils 13 are not energized, thus minimizing the possibility of the rotor becoming locked in a circular form and unresponsive to magnetic excitation. The invention may have the rotor 2 constructed with a large internal hole 40 for passing wires and process lines as may be needed for manufacturing process applications.

In many embodiments, the flexible shell 22 deforms into a functional elliptical cross-section under operational forces while one end remains rigidly coupled to the rotor output flange 23. In such cases, as shown in FIG. 2, the flexible shell 22 must be designed to flex radially to contact the stator frictional surface 17 following the electromagnetic wave while maintaining a circular form at the coupling end 23a. An alternative coupling means is to interlace axial or radial splines (not shown) of the flexible shell 22 with matching splines (not shown) of the rotor output flange 23 at the coupling end 23a. Such spline coupling is known in the art and allows transmission of torque from the flexible shell 22 to the rotor output flange 23 through a sliding relative motion.

The elastic wave actuator may be fitted with an electronic controller to generate and supply the rotating electromagnetic field, and a sensor-encoder (optical, magnetic or otherwise) to provide a feedback signal indicative of the position of the rotor for electronic control of field commutation, positioning, current, speed or torque. For example, in FIG. 1, an electromagnetic sensor 30 together with encoding circuitry may be positioned within stator housing part 10b to detect the passing of metallic teeth 32 protruding radially inwards from the internal circumference of elliptical cam 28. The electromagnetic pulse generated as each tooth passes the sensor 30 could be fed to a counter and relayed to the electronic controller as input for control decisions. Such electronic controller circuits may excite the stator coils 13 with a multi-phase electrical power excitation or a Pulse Width Modulated (PWM) electrical excitation as is customary for servo controlled AC electric motors to generate the rotating electromagnetic field. Alternately, the sensor-encoder 30 may be located to detect the position of the flexible shell directly. However, detecting the position of the elliptical cam 28, which rotates at a much higher speed than the flexible shell, provides higher resolution counts to the electronic controller supportive of better control performance.

In another embodiment shown in FIG. 7, the elastic wave actuator may be configured having the rotor external to the stator. This embodiment functions essentially as in the inner-rotor embodiment and functions with the control systems, cam output and other embodiments described for the outer-stator embodiment as, readily contemplated by those skilled in the art.

A cam output shaft 45 can be coupled to the elliptical cam 28 to provide an alternate high speed cam output to the elastic wave actuator (see FIG. 8). The elliptical cam 28 rotates at the high rotational speed of the electromagnetic field, which is synchronous with the frequency of the field excitation. Therefore, a high-speed power cam output is also available from this actuator as is with conventional motors. The elliptical cam 28, which rotates at high synchronous speed, is shown coupled to a cam output shaft 45 and mounted within housing part 10b by means of bearing 46. Bearing 46 being clamped between the elliptical cam 28 and the housing part 10b with retainers 47 and 48 and bolts 47a and 48a respectively. Bearing 46 may be a moment carrying bearing or a set of two axially spaced angular contact, or deep groove, bearings as conventional in the art. Cam output shaft 45 may serve as a power output shaft rotating at the high speed of the elliptical cam 28 which is synchronous with the rotational speed of the electromagnetic field.

The availability of high-speed synchronous power demonstrates the capability of the invention to convert electrical energy to mechanical energy by novel means. Conventional electric motors use electromagnetic induction through an air-gap between the rotor and stator to generate electromagnetic forces that rotate the motor's armature, However, the invention utilizes the much larger magnetic attractive forces between rotating electromagnetic poles and a ferromagnetic rotor to induce an elastic wave into a flexible shell which applies torque to carry the elliptical cam with the rotating electromagnetic field. Therefore, the motion of the elastic wave is transferred into a high-speed rotor while the flexible shell itself rotates at a lower speed. Hence the actuator simultaneously converts electrical energy to two forms of mechanical energy, one available at the high rotational speed cam shaft output and another available at the low rotational speed rotor shaft output.

Method of Operation

As is conventional in electrical machines, and described in common text books (such as, "Principles of Electrical Engineering" by John J. D'Azzo, published by Merrill 1968), a rotating magnetic field may be generated electrically when an electrical current is passed through the stator coils 13. The design of the stator 1, including the number of poles, lamination geometry, the magnetic circuit parameters, the characteristics of the electrical input and the type of wire windings in the stator coils 13 must follow conventional design rules for electromagnetic machines to generate such rotating electromagnetic field. Referring to FIG. 9 and FIG. 10, the rotating magnetic field has a dominant magnetic vector, V that rotates around the central axis 4 as indicated by the curved arrow 34. The presence of the magnetic field causes the flexible shell 22 to be biased along the vector V by magnetic attraction and to contact the stator frictional surface 17 at point 0. In a preferred geometry, the flexible shell 22 may be attracted to flex out at two diametrically opposite points 0 and 180. Preferably, the elliptical cam 28 may be used to force the flexible shell to assume an elliptical geometry and maintain contact with the stator at the two points 0 and 180.

As the vector V rotates a full revolution, the points of contact 0 and 180 of FIG. 9 travel circumferentially along the stator frictional surface 17 in a full circle to their original starting points as shown in FIG. 10. During the full circle rotation of vector V, the flexible shell 22 remains in contact with the stator frictional surface 17 and progresses, without slipping. Thus, the flexible shell experiences an elastic wave deformation that propagates through the shell at the rotational speed of the electromagnetic filed. When the diameter of the stator frictional surface 17 is S, the points of contact 0 and 180 of the flexible shell 22 must travel a distance of $\Pi S$ (circumference of stator frictional surface 17) when vector V makes a full rotation. In its free, non-deformed, state the flexible shell 22 has an outer surface diameter R which differs from the diameter S, and the outer circumference ($\Pi R$) of the flexible shell 22 also differs from the circumference ($\Pi S$) of stator frictional surface 17. Therefore, the flexible shell 22 must turn through a certain angle corresponding to the circumference difference ($\Pi S - \Pi R$) as it progresses in contact with the stator frictional surface 17 when vector V makes a full rotation. For an embodiment with an internal rotor R<S, while for an embodiment with an external rotor R>S. Therefore, the rotor must rotate through an angle equal to $(\Pi S - \Pi R)/(S/2)$ for each revolution (angle $2\Pi$) of the vector V. Hence, the ratio between the angle of rotation of the magnetic field to the angle of rotation of the flexible shell is $2\Pi/[(\Pi S - \Pi R)/(S/2)] = S/(S-R)$.

By adjusting the difference in diameters (S−R) the ratio of rotor 2 rotation to electromagnetic field (vector V) rotation can be controlled. Rotor 2 rotation can be controlled to be a small fraction of magnetic field rotation. The resultant low-speed high-torque output can be similar to that of a common gear-reduced high-speed electric motor. For example, if S=100 and R=99, the ratio of the magnetic field rotational speed to the rotor speed is 100/(100−99)=100. This is equivalent to a conventional synchronous motor with a gear reducer of 100:1 gear ratio.

Contrary to prior art, the permanent magnet segments 25 are arranged about flexible shell 22 with the same radial polarity orientation to interact with the stator magnetic field resulting in the desired shell elliptical shape (FIG. 11). The electromagnetic field may be structured to have two rotating and orthogonal components—one directed inwards and one directed outwards, i.e., having opposite magnetic polarities such as in a 4-pole arrangement. The magnetic field components attract the permanent magnets along one axis 41 and repulse them along an orthogonal axis 42 causing the shell to deform elliptically. As the two orthogonal components of the electromagnetic field rotate, the magnetic polarity of the rotor remains unchanged; hence, the elliptical shape propagates as an elastic wave through the flexible shell. The elliptical shape is generated in this preferred embodiment even without an elliptical cam 28. The strong magnetic attraction of the permanent magnets to the stator surface at the points of contact along the ellipse's major axis and the weaker attraction along its minor axis help maintain the elliptical geometry when the electromagnetic filed is de-energized. In contrast with the prior art, this effect stabilizes the actuator's geometry and allows the actuator to resume its rotation from where it had stopped without slippage or loss of commutation control.

It should be noted that the elliptical form of the cam, with two diametrically opposed points of contact, is a preferred embodiment. The invention may be practiced with one point of contact such as with a circular cam, three points of contact with a three-apex cam or four points with a four-apex cam. Other stator pole configurations may be used to interact with the permanent magnet segments and yield more than two points of contact with non-orthogonal axes of attraction and repulsion. Such alternate configurations may be preferred for some applications especially when lower speed ratios are targeted for the high torque embodiment.

It is understood that the above descriptions of the present invention are merely illustrative of preferred embodiments of which many variations may be practiced within the scope of the claims and the reasonable efforts of those skilled in the arts described.

What is claimed is:

1. An elastic wave actuator comprising:
    a stator, and rotor sharing a common central axis;
    the stator having a plurality of electromagnets with pole laminations positioned around a stator frictional surface and the central axis;
    the rotor comprising an output flange outwardly extended in a radial direction with respect to the central axis, and coupled to a cylindrical magnetically permeable flexible shell, wherein the flexible shell is coaxially positioned with respect to the stator and coupled to the rotor output flange, wherein the flexible shell is magnetically deformed into an elliptical shape by the plurality of electromagnets to frictionally engage the stator frictional surface at points of contact;
    a means for maintaining the elliptical shape in the flexible shell;
    an electronic means to energize the electromagnets to generate a rotating electromagnetic field progressively deforming the flexible shell to contact the stator at points of contact that rotate around the stator frictional surface.

2. An elastic wave actuator according to claim 1 further comprising a rotor output shaft coupled to the flexible shell to provide a low speed high torque power output.

3. An elastic wave actuator according to claim 1 wherein the means for maintaining the elliptical shape in the flexible shell is an elliptical cam positioned coaxially within the flexible shell.

4. An elastic wave actuator according to claim 3 further comprising a cam output shaft coupled to the elliptical cam to provide a high speed power output.

5. An elastic wave actuator according to claim 3 further comprising a low friction bearing placed between the flexible shell and the elliptical cam.

6. An elastic wave actuator according to claim 1 wherein the flexible shell is essentially circular; when being magnetically deformed into the elliptical shape, the elliptical-shaped flexible shell contacts the stator frictional surface at two points of contact.

7. The elastic wave actuator of claim 1 wherein the rotor is internal to the stator.

8. The elastic wave actuator of claim 1, further comprising:
    the rotor being mounted internally to the stator;
    an elliptical cam positioned coaxially within the rotor flexible shell;
    a cam output shaft coupled to the elliptical cam to provide high speed power output; and,
    a rotor output shaft coupled to the flexible shell to provide low speed high torque power output.

9. The elastic wave actuator of claim 1 wherein the rotor is external to the stator.

10. An elastic wave actuator according to claim 1 wherein the flexible shell comprises a magnetically permeable core to provide a path for electromagnetic flux produced by the stator electromagnets.

11. An elastic wave actuator according to claim 10 wherein the core is formed as a compact spiral ribbon lamination.

12. An elastic wave actuator according to claim 10 wherein the core is formed as a compact helical ribbon lamination.

13. An elastic wave actuator according to claim 10 wherein the core is formed in segmented layers.

14. An elastic wave actuator according to claim 10 further comprising permanent magnet segments mounted circumferentially to the core and radially arranged with the same polarity orientation.

15. An elastic wave actuator according to claim 14 wherein the means for maintaining the elliptical shape in the flexible shell comprises the rotating magnetic field attracting the permanent magnets along at least one axis and repulsing the permanent magnets along at least one other axis.

16. An elastic wave actuator according to claim 14 wherein the means for maintaining an elliptical shape in the flexible shell comprises the rotating magnetic field attracting the permanent magnets along one axis and repulsing the permanent magnets along an orthogonal axis.

17. An elastic wave actuator according to claim 1 further comprising a sensor-encoder means to provide a signal indicative of rotor position for electronic control of field commutation, positioning, current, speed or torque.

18. An elastic wave actuator according to claim 1 wherein the flexible shell has gear serrations which mesh with matching serrations of equal pitch formed in or near the stator frictional surface to keep the rotor speed synchronized at a definite speed ratio with the rotating electromagnetic field.

19. An elastic wave actuator according to claim 1 wherein the rotor is rotatably mounted to the stator using a moment carrying bearing or two axially spaced radial bearings.

20. An elastic wave actuator according to claim 1 further comprising an electronic controller and a power source.

21. An elastic wave actuator according to claim 20 wherein the controller excites the stator electromagnets with Pulse Width Modulated electrical excitation.

22. A method for converting electrical energy into mechanical energy using the elastic wave actuator according to claim 1.

* * * * *